(12) United States Patent
Flores Renteria et al.

(10) Patent No.: US 12,344,557 B2
(45) Date of Patent: Jul. 1, 2025

(54) CERAMIC MATERIAL, LAYER AND LAYER SYSTEM

(71) Applicant: Siemens Energy Global GmbH & Co. KG, Bayern (DE)

(72) Inventors: Arturo Flores Renteria, Berlin (DE); Werner Stamm, Mülheim an der Ruhr (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 920 days.

(21) Appl. No.: 17/312,642

(22) PCT Filed: Nov. 19, 2019

(86) PCT No.: PCT/EP2019/081729
§ 371 (c)(1),
(2) Date: Jun. 10, 2021

(87) PCT Pub. No.: WO2020/126258
PCT Pub. Date: Jun. 25, 2020

(65) Prior Publication Data
US 2022/0041510 A1     Feb. 10, 2022

(30) Foreign Application Priority Data

Dec. 17, 2018   (DE) ..................... 10 2018 221 940.0

(51) Int. Cl.
*C04B 35/486*   (2006.01)
*C23C 4/02*   (2006.01)
(Continued)

(52) U.S. Cl.
CPC .............. *C04B 35/486* (2013.01); *C23C 4/02* (2013.01); *C23C 4/11* (2016.01); *C23C 4/134* (2016.01);
(Continued)

(58) Field of Classification Search
CPC .............................. C04B 35/48; C04B 35/486
See application file for complete search history.

(56) References Cited

U.S. PATENT DOCUMENTS 6,025,078 A * 2/2000 Rickerby ............ C23C 28/3455
                                                       428/472
6,812,176 B1 * 11/2004 Zhu ........................ C04B 35/486
                                                       501/103
(Continued)

FOREIGN PATENT DOCUMENTS

CN          1994732 A       7/2007
CN        103874784 A       6/2014
(Continued)

OTHER PUBLICATIONS

Huang, Xia et al.: Experimental study of the thermal conductivity of metal oxides co-doped yttria stabilized zirconia. In: Materials science and engineering B, vol. 149, 2008, No. 1, S. 63-72.—ISSN 0921-5107; 2008.

(Continued)

*Primary Examiner* — Matthew E. Hoban
(74) *Attorney, Agent, or Firm* — Wolter Van Dyke Davis, PLLC

(57) ABSTRACT

A ceramic material which contains yttrium oxide as stabilizers and at least one of the materials erbium oxide or ytterbium oxide provides a phase having sintering stability for a ceramic material for ceramic layers and a ceramic layer system which maintain the mechanical and thermal properties for a long time even when used at high temperatures.

12 Claims, 1 Drawing Sheet

(51) Int. Cl.
*C23C 4/11* (2016.01)
*C23C 4/134* (2016.01)

(52) U.S. Cl.
CPC ............. *C04B 2235/3206* (2013.01); *C04B 2235/3208* (2013.01); *C04B 2235/3225* (2013.01); *C04B 2235/3229* (2013.01); *C04B 2235/3246* (2013.01)

(56) References Cited

U.S. PATENT DOCUMENTS

| | | | |
|---|---|---|---|
| 6,887,595 B1* | 5/2005 | Darolia | C23C 14/08 427/584 |
| 12,187,652 B2* | 1/2025 | Flores Renteria | C23C 28/321 |
| 2008/0107920 A1 | 5/2008 | Rowe et al. | |
| 2014/0315006 A1 | 10/2014 | Stamm | |

FOREIGN PATENT DOCUMENTS

| | | |
|---|---|---|
| EP | 0825271 A1 | 2/1998 |
| EP | 1536039 A1 | 6/2005 |
| EP | 1550644 A1 | 7/2005 |
| WO | 2019129457 A1 | 7/2019 |
| WO | 2019174836 A1 | 9/2019 |
| WO | 2021093999 A1 | 5/2021 |

OTHER PUBLICATIONS

PCT International Search Report and Written Opinion of International Searching Authority mailed Jan. 31, 2020 corresponding to PCT International Application No. PCT/EP2019/081729 filed Nov. 19, 2019.

* cited by examiner

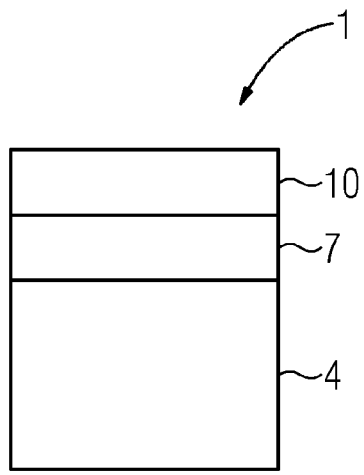
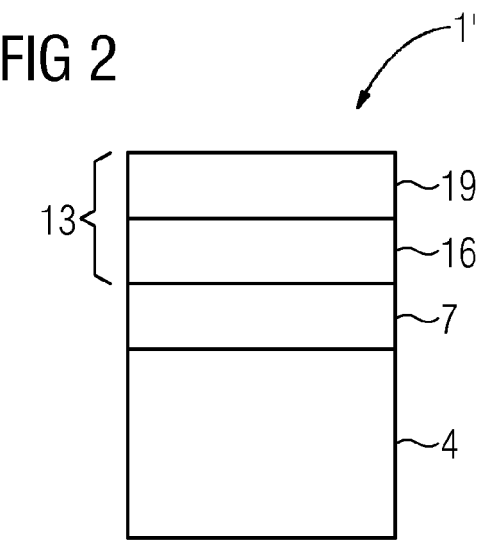

CERAMIC MATERIAL, LAYER AND LAYER SYSTEM

CROSS REFERENCE TO RELATED APPLICATIONS

This application is the US National Stage of International Application No. PCT/EP2019/081729 filed 19 Nov. 2019, and claims the benefit thereof. The International Application claims the benefit of German Application No. DE 10 2018 221 940.0 filed 17 Dec. 2018. All of the applications are incorporated by reference herein in their entirety.

FIELD OF INVENTION

The invention relates to a ceramic material based on zirconium oxide with stabilizers, a layer and a layer system composed thereof.

BACKGROUND OF INVENTION

Turbine blades or components in general for high-temperature use are often provided with thermal barrier coatings. These are usually ceramic thermal barrier coatings based on zirconium oxide, fully or partially stabilized or based on pyrochlores, for example gadolinium zirconate.

Requirements which the ceramic thermal barrier coating has to meet are not only a low thermal conductivity but also a high fracture toughness and low sintering tendency, so that mechanical stresses can also be withstood over time.

SUMMARY OF INVENTION

It is therefore an object of the invention to provide a ceramic material which solves these problems.

The object is achieved by a ceramic material, a layer and a layer system as claimed.

BRIEF DESCRIPTION OF THE DRAWINGS

FIGS. 1, 2 schematically show a layer system on the basis of the invention.

DETAILED DESCRIPTION OF INVENTION

The figures and the description present working examples.

The ceramic material has a tetragonal and cubic crystal structure which depends on the proportion of the stabilizer yttrium oxide. The tetragonal phase is stabilized by the proportion of yttrium oxide.

The ceramic material based on zirconium oxide ($ZrO_2$) contains yttrium oxide ($Y_2O_3$) and also at least one further, in particular two further, very particularly advantageously only two further, oxides selected from the group consisting of erbium oxide ($Er_2O_3$) and ytterbium oxide ($Yb_2O_3$), which advantageously act as stabilizers.

It optionally contains at least one further oxide, in particular at least two further oxides, selected from the group consisting of: hafnium oxide ($HfO_2$), cerium oxide ($CeO_2$), calcium oxide (CaO) and/or magnesium oxide (MgO) present in a proportion of in particular at least 0.1 mol %, in particular at least 0.5 mol % and in particular at most 5 mol %.

The proportion of yttrium oxide ($Y_2O_3$) is advantageously 2.0 mol %-3.9 mol %, in particular 2.5 mol %-3.5 mol %.

An advantage is given to using 2.1 mol %-4.9 mol % of erbium oxide ($Er_2O_3$) and/or ytterbium oxide ($Yb_2O_3$), in particular 2.5 mol %-4.5 mol % of erbium oxide ($Er_2O_3$) and/or ytterbium oxide ($Yb_2O_3$).

The proportion of ytterbium oxide ($Yb_2O_3$) is advantageously 3.5 mol % of ytterbium oxide ($Yb_2O_3$).

The proportion of yttrium oxide ($Y_2O_3$) is advantageously 3.0 mol % of yttrium oxide ($Y_2O_3$).

Exemplary embodiments (nonexhaustive) include:
$ZrO_2/Y_2O_3/Yb_2O_3+$
$HfO_2$
$CeO_2$
CaO
MgO
$CeO_2$+CaO
$CeO_2$+MgO
CaO+MgO
$HfO_2$+$CeO_2$
$HfO_2$+CaO
$HfO_2$+MgO
$CeO_2$+CaO+MgO
$HfO_2$+CaO+MgO
$HfO_2$+$CeO_2$+MgO
$HfO_2$+$CeO_2$+CaO
$HfO_2$+$CeO_2$+CaO+MgO A ceramic layer can be produced from this ceramic material. To produce the layer, it is possible to use all coating methods known from the prior art, for example plasma spraying (APS, VPS, LPPS, . . . ) or HVOF.

A ceramic layer composed of this ceramic material has, in particular, a thickness of 20 μm, in particular from 200 μm to 2000 μm, and is produced by atmospheric plasma spray. The layer can likewise be produced by an EBPVD process and then advantageously has a layer thickness of from 20 μm to 1000 μm.

The ceramic layer can be applied as single layer (FIG. 1) or as double layer (FIG. 2) in the layer system.

FIG. 1 shows a layer system 1 comprising a substrate 4. The substrate 4 is advantageously metallic and advantageously a nickel- or cobalt-based superalloy. The substrate 4 can likewise be made of ceramic and in particular can comprise a CMC material.

A bonding layer 7 is present on the substrate 4. In the case of a metallic material, this is advantageously an NiCoCrAlY layer 7.

A single layer 10 composed of the ceramic material according to the invention is then present on the bonding layer 7.

FIG. 2 shows a further layer system 1' in which the single layer is replaced by a double layer 13 made up of an inner layer 16, in particular based on partially yttrium-stabilized zirconium oxide but different from the material of the outer layer, and an outer layer 19 based on the ceramic material of the invention.

The ceramic bonding layer 16 located at the bottom is advantageously a partially stabilized yttrium oxide-zirconium oxide layer, in particular with 3 mol %-4 mol % of yttrium oxide ($Y_2O_3$).

In both cases (FIG. 1, 2), at least the outer ceramic layer 10, 19 can be segmented (DVC).

The invention claimed is:
1. A ceramic material based on
zirconium oxide (ZrO2) with 6.0 mol %-16 mol % yttrium oxide (Y2O3);
2.5 mol %-4.5 mol % ytterbium oxide (Yb2O3); and
hafnium oxide (HfO2), cerium oxide (CeO2), calcium oxide (CaO) and magnesium oxide (MgO) collectively present in a combined total proportion of at least 0.1 mol % and at most 5 mol %.

2. The ceramic material as claimed in claim 1, which comprises
3.0 mol %-4.0 mol % of ytterbium oxide (Yb2O3).

3. The ceramic material as claimed in claim 1, comprising 3.5 mol % of ytterbium oxide (Yb2O3).

4. A ceramic layer
consisting of the ceramic material as claimed in claim 1.

5. The ceramic layer as claimed in claim 4,
produced by APS and in particular having a layer thickness of from 20 μm to 2000 μm.

6. The ceramic layer as claimed in claim 4,
produced by EB-PVD and in particular having a layer thickness of from 20 μm to 1000 μm.

7. A layer system comprising at least
a substrate,
metallic or ceramic,
a bonding layer,
either metallic or ceramic,
at least one layer composed of the ceramic material as claimed in claim 1.

8. The layer system as claimed in claim 7,
wherein a ceramic bonding layer consisting of partially stabilized zirconium oxide is present.

9. The layer system as claimed in claim 7,
wherein at least the at least one layer composed of the ceramic material is segmented.

10. A ceramic material based on:
zirconium oxide (ZrO2) with 2.0 mol %-3.9 mol % yttrium oxide (Y2O3);
2.1 mol %-4.9 mol % of ytterbium oxide (Yb2O3); and
hafnium oxide (HfO2),
cerium oxide (CeO2),
calcium oxide (CaO), and
magnesium oxide (MgO),
collectively present in a combined total proportion of least 0.1 mol % to 0.5 mol %.

11. The ceramic material as claimed in claim 1,
wherein the combined total proportion is at least 0.1 mol % to 0.5 mol % hafnium oxide (HfO2), cerium oxide (CeO2), calcium oxide (CaO) and magnesium oxide (MgO).

12. The ceramic material as claimed in claim 1,
wherein the combined total proportion is 0.1 mol % hafnium oxide (HfO2), cerium oxide (CeO2), calcium oxide (CaO) and magnesium oxide (MgO).

* * * * *